United States Patent
Kretzschmar et al.

[15] 3,643,784
[45] Feb. 22, 1972

[54] TRANSPORT CONTAINER FOR USE WITH A CONVEYOR SYSTEM

[72] Inventors: Heinz Kretzschmar, Wiesensteig; Franz Naumann, Muhlhausen, both of Germany

[73] Assignee: Organisation Ralfs KG, Wiesensteig, Germany

[22] Filed: Mar. 9, 1970

[21] Appl. No.: 17,757

[30] Foreign Application Priority Data

Mar. 7, 1969 Germany........................P 19 11 596.9

[52] U.S. Cl................................................................198/38
[51] Int. Cl..........................................................B65g 43/08
[58] Field of Search...................................................198/38

[56] References Cited

UNITED STATES PATENTS 3,034,634  5/1962  Brand........................................198/38

FOREIGN PATENTS OR APPLICATIONS 1,076,570  2/1960  Germany..................................198/38

Primary Examiner—Edward A. Sroka
Attorney—Michael S. Striker

[57] ABSTRACT

A transport container has peripheral walls including a pair of transversely spaced sidewalls which extend in at least substantial parallelism with the intended direction of movement of the container and are composed of flexible material. An elongated contact strip overlies the outer surface of at least one of the sidewalls and has two end portions. At least one of these end portions is connected with the respective sidewall in such a manner that the strip and the sidewall are connected with limited freedom of displacement relative to one another to thereby limit the transmission of stresses between them. The other end portion may be similarly connected or it may be immovably connected with the respective sidewall.

14 Claims, 7 Drawing Figures

PATENTED FEB 22 1972

INVENTOR

HEINZ KRETZSCHMAR
FRANZ NAUMANN

By Michael S. Striker
Attorney

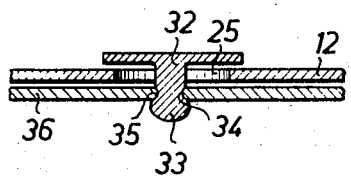
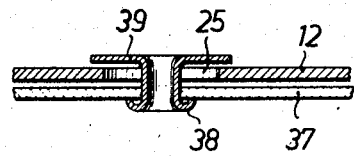
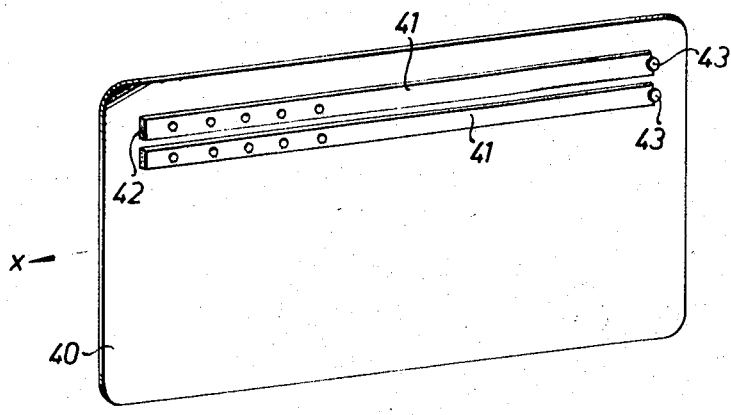

TRANSPORT CONTAINER FOR USE WITH A CONVEYOR SYSTEM

BACKGROUND OF THE INVENTION

The present invention relates generally to transport containers for use with conveyor systems and more particularly to transport containers for use with conveyor systems having conveyor channels bounded by upstanding sidewalls.

In conveyor systems of the type just mentioned, it is known to utilize transport containers at least the sidewalls of which consist of flexible material, usually a synthetic plastic, which can be deformed in direction inwardly as well as outwardly of the container. The purpose of making the sidewalls flexible in this manner is to assure that the width of the container can automatically accommodate itself to the quantity and/or configuration of material received and transported in the container, and further reason for the use of flexible sidewalls is to permit an accommodation of the container to the configuration of the guide channel of the conveyor system, for instance, bends or curves thereof, as well as to reduce the noise resulting from advancement of the containers through such guide channels.

In the use of such containers in conveyor systems of the type just briefly outlined, it is known to provide at suitable locations at the exterior of the container contact strips which cooperate with auxiliary routing devices arranged along the conveyor system, so that these devices are actuated — in dependence upon the arrangement, configuration, etc., of the contact strips — to thereby effect routing of the respective containers to different portions of the system in dependence upon commands issued to the routing device by the contact strip.

Any problems with this known prior art result from the stresses which are transmitted between the contact strip and the respectively associated flexible sidewall in response to flexing of the latter. Such stresses may be tensile stresses or pressures which can damage either or both the sidewall and the contact strip.

SUMMARY OF THE INVENTION

It is, accordingly, an object of the present invention to overcome this disadvantage. More particularly, it is an object of the invention to provide a transport container of the type under discussion wherein the transmission of such stresses between the contact strip and the associated sidewall is either eliminated, or at least reduced to a negligible factor.

In pursuance of the above objects and of others which will become apparent hereafter, we provide a transport container of the type under discussion which, briefly stated, comprises peripheral wall means including a pair of transversely spaced sidewalls extending in at least substantial parallelism with the intended direction of movement of said container and being composed of flexible material. Contact means is adapted to cooperate with auxiliary routing devices of said conveyor system whereby to effect routing of the container in a desired path. This contact means comprises at least one elongated contact strip provided on and overlying a portion of an outwardly directed surface of one of the said sidewalls. In accordance with the invention we further provide connecting means connecting the contact strip to said one sidewall with limited freedom of relative displacement of said contact strip and said one sidewall whereby to at least limit the transmission of stresses between them.

In this manner we obtain a significant increase both in the life expectancy of the containers and in the operational reliability of a conveyor system with which our novel containers are used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view similar to FIG. 4 illustrating an additional embodiment;

FIG. 6 is a view similar to FIG. 5 showing yet a further embodiment; and

FIG. 7 is a diagrammatic side elevational view showing a sidewall of a container according to the present invention which is constructed in accordance with yet another embodiment of the invention.

DESCRIPTION OF THE PREFERRED EMBODIMENTS

Figure 1:
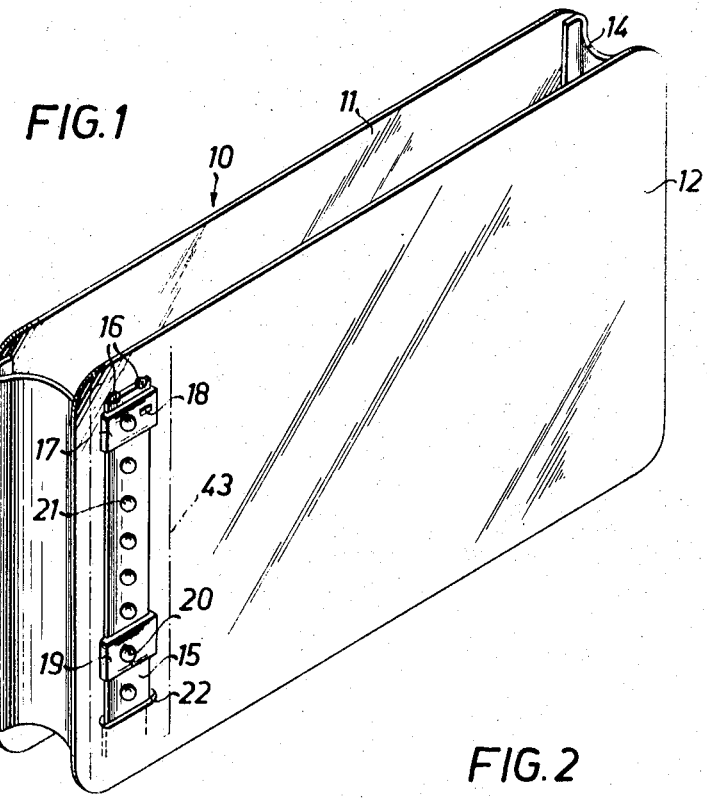
FIG. 1 is a somewhat diagrammatic respective view of a container according to one embodiment of the invention.
Figure 2:
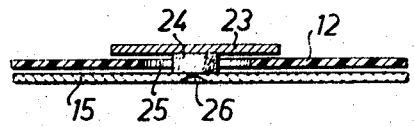
FIG. 2 is a fragmentary longitudinal section through the connection between the contact strip and the container of FIG. 1, shown on an enlarged scale.
Figure 3:
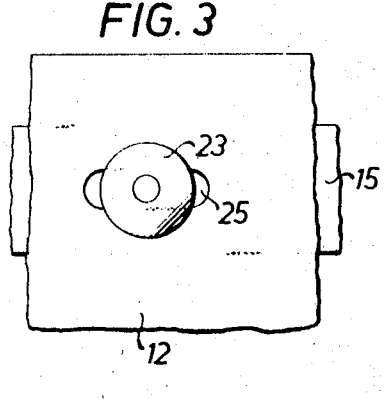
FIG. 3 is a plan view of FIG. 2, looking downwardly with respect to the drawing.

Discussing firstly the embodiments illustrated in FIGS. 1–3, it is pointed out that reference numeral 10 identifies the novel transport container per se. A conveyor system with which the container is to be used has not been illustrated, because such a system does not form part of the present invention and is in any case well known to those skilled in the art.

The container 10 is intended to move in a predetermined direction along such a conveyor system and the direction of movement has been identified in FIG. 1 by the arrow X. The walls bounding the container 1 consist of flexible material, for instance a suitable synthetic plastic. Reference numerals 11–12 identify the transversely spaced sidewalls of the container whereas reference numerals 13–14 identify the sidewalls. A nonillustrated bottom wall also consists of flexible material. It will be appreciated that sidewalls 11 and 12 can move towards and from one another and can also be distended themselves.

At least one of the sidewalls, here the sidewall 12, is provided with a contact strip 15 which overlies a portion of its outwardly directed surface. The strip may consist of the same material as wall 12 or different material. In the illustrated embodiment the strip 15 is elongated in a direction normal to the direction of movement X. It is connected with the sidewall 12 in such a manner that the two have limited freedom of displacement to one another to avoid or reduce the transmission of stresses between them.

The upper end portion of strip 15 is rigidly secured to wall 12, for instance by spot welds. Below the spot welds 16 the strip 15 has secured thereto a slide switch or contact which in the illustrated embodiment embraces the strip 15. A kerf 18 provides for interlocking between the contact 17 and the strip 15. An additional slide contact 19 is also provided. The exposed side of the strip 15 is provided with a plurality of depressions or projections 21 and the sides of the contacts 17 and 19 which face the strip 15 are provided with corresponding projections or depressions 20, so that, as the contacts are displaced lengthwise of the strip 15 (the contact 17 can also be stationary and held in a position by provision of the kerf 18), they can be arrested at desired locations by cooperation between the elements 20 and 21. It will be appreciated that the position of the contacts 17 and 19 determines in a known manner how the auxiliary routing devices of a conveyor system are actuated and thereby determines through presetting of the contacts 17 and 19 the limit routing or path for the container 10.

The lower end portion of the strip 15 extends through a slot 22 of the wall 12 to the interior of the container and abuts against the inner side of the wall 12.

As shown in FIG. 2 the connecting means which connects the strip 15 in the region of this lower end portion with the wall 12 may be in a particularly advantageous manner in form of a disk 23 of synthetic plastic material which is spotwelded with the strip 15 as indicated at 24. The weld 24 thus would constitute a first portion of the connecting means, and the disk 24 would constitute a second portion. It is advantageous that the spot weld 24 extends through a slotlike aperture 25 provided in the sidewall 12 and extending lengthwise of the strip 15, i.e., normal to the direction X. It is advantageous that a contact point 26 be provided at the outer side of the strip 15 oppositely the spot weld 24 at the same time as the spot weld is formed.

FIG. 3 shows that the disk 23 is of circular outline. It may consist of the same material as the wall 12 and/or the strip 15. This material should be capable of flexing as mentioned before but should be sufficiently firm to be self-supporting. The diameter of the spot weld 24 is only slightly smaller than the narrower cross section or dimension of the aperture 25, and of course, the disk is substantially larger than this dimension to prevent its withdrawal through the aperture. The free end of the strip 15 is thus given limited freedom of movement with reference to the wall 12 and vice versa, the extent of movement being governed by the distance through which the spot weld 24 can be displaced in the aperture 25 lengthwise thereof.

Figure 4:
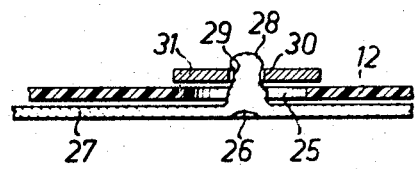
FIG. 4 is a view similar to FIG. 2 but illustrating a further embodiment.

In the embodiment of FIG. 4 the strip 27 corresponds to the strip 15 of FIGS. 1-3. It is provided with a studlike projection 28, the free end of which is formed with an annular circumferential groove 29. The disk 23 is replaced with an annulus 31 and the marginal zone bounding the center opening 30 of the annulus 31 is received in the groove 29 with a snap action. The operation of the embodiment in FIG. 4 is of course the same as in FIGS. 1-3. If desired, a certain pretension of the annulus 21 with respect to the strip 27 can be obtained in that the distance of the groove 29 from the surface of the strip 27 from which the projection 28 extends, is slightly smaller than the thickness of the wall 12.

The embodiment of FIG. 5 shows that it is possible to reverse the construction of FIG. 4 and to provide the strip 36 (corresponding to the strips 15 and 27) with an opening 35, while a disk 32 is provided with a studlike projection 33 whose free end is formed with annular circumferential groove 34 in which the marginal zone of the strip 36 bounding the opening 35 is received with a snap action. In this embodiment the portion of the projection 33 which extends outwardly beyond the exposed side of the strip 36 constitutes simultaneously a contact point for the associated slide switches (not shown) which in this case of course will be provided with cooperating depressions rather than projections as in the case of FIGS. 1-4 where the contact points 26 where in form of recesses.

The embodiment of FIG. 6 shows a construction where a strip 37 is provided with an aperture (no reference numeral) through which a tubular sleeve or stud 38 extends. The sleeve 38 also extends through the aperture 25 of the wall 12 and its opposite axial ends are upset, thus forming annular collars of which the one identified with reference numeral 29 prevents withdrawal of the stud 38 from the aperture 25. The stud 38 is identified as consisting of metal but can, of course, be of plastic material. The axial end of the stud 38 which is located at the exposed side of the strip 37 also serves as a contact point for the slide switches.

In the embodiments illustrated, the first portion of the connecting means, for instance, the stud 33 of FIG. 5 is so dimensioned that it almost fills the smaller cross-sectional dimension of the aperture 25, so that the connecting means essentially has freedom of movement in a direction lengthwise of the aperture 25.

Coming to the embodiment in FIG. 7 it will be seen that here there are provided two strips 41 which, contrary to the preceding embodiments extend in the region of the upper edge of a sidewall 40, in parallelism with the direction of movement X. The leading end portions 42 — i.e., leading with respect to the direction of movement X — are immovably secured with the sidewall 40, as by welding. The connecting means — which may correspond to any of the embodiments of FIGS. 1-6 — is here provided at the trailing end portions of the strips 41, and more particularly at the very end of the strips 41, as shown at 43, and of course in this case the elongation of the slots 25 again extends lengthwise of the strips 41 but, owing to the particular orientation of the latter, in direction of movement X. Contact points are again provided as the preceding embodiments. Here, the trailing end portions of the strips 41 do not extend through slots to the interior of the sidewall 40 and this is the reasons for the location of the connecting means at the very ends of the strips 41.

It is emphasized that the manner in which the contact strip is shown secured in FIG. 1 can also be employed in an arrangement such as in FIG. 7, i.e., with the contact strip extending in parallelism with the direction of movement X. Similarly, the arrangement of the connecting means at the very end of the strip or strips and without an end portion of the strip extending to the interior of the sidewall (i.e., the embodiment of FIG. 7) can also be employed if the strip is to be oriented as shown in FIG. 1 normal to direction X.

It remains to point out that reference numeral 44 in FIG. 1 identifies a foil of synthetic plastic material which freely overlies on the inner side of the wall 12 the slot 25 and the connecting means, as well as the inwardly extending end portion of the strip 15. The foil 44 is shown in chain lines and it will be seen that its margins are spaced outwardly away from the aperture 25, the connecting means and the end portion of the strip 15. The margins are connected with the inner side of the wall 12, as by welding, thus forming a pocket which surrounds and protects the components located and exposed at the inner side of the wall 12 and at the same time protects the contents of the container.

It will be understood that each of the elements described above, or two or more together, may also find a useful application in other types of constructions differing from the types described above.

While the invention has been illustrated and described as embodied in a transport container for use with a conveyor system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A transport container for use with a conveyor system, comprising peripheral wall means, including a pair of transversely spaced sidewalls extending in at least substantial parallelism with the intended direction of movement of said container and being composed of resiliently yieldable material; contact means adapted to cooperate with auxiliary routing devices of said conveyor system whereby to effect routing of the container in a desired path, said contact means comprising at least one elongated contact strip provided on and overlying a portion of an outwardly directed surface of one of said sidewalls; and connecting means connecting said contact strip to said one sidewall with limited freedom of relative displacement of said one sidewall and said contact strip in longitudinal direction of the latter, whereby to at least limit the transmission of stresses between them.

2. A container as defined in claim 1, said contact strip having spaced end portions, and said connecting means connecting at least one of said end portions with said one sidewall for said limited relative displacement.

3. A container as defined in claim 2, said one sidewall having an aperture; and said connecting means comprising a first portion rigid with said one end portion and extending through said aperture with limited freedom of displacement therein, and a second portion provided on said first portion and engaging said one sidewall, said second portion being larger than at least one transverse dimension of said aperture for preventing withdrawal through the same.

4. A container as defined in claim 3, said second portion being disc-shaped and spotwelded to said first portion.

5. A container as defined in claim 3, said first portion being a tubular stud having a free end section defining an annular bead which engages said one sidewall and constitutes said second portion.

6. A container as defined in claim 3, said one end portion having an opening, and said second portion being a disc provided with a stud constituting said first portion, said stud extending through said aperture into and being retained with a snap action in said opening.

7. A container as defined in claim 6, said stud having an annular circumferential groove located outwardly of said outwardly directed surface, and said strip having a marginal zone bounding said opening and received with a snap action in said groove.

8. A container as defined in claim 3, said strip being elongated in said intended direction of movement said one end portion trailing and the other of said end portions leading with reference to said direction of movement; and wherein said other end portion is immovably connected to said one sidewall.

9. A container as defined in claim 3, said strip comprising a plurality of contact points spaced lengthwise of said strip, and a slide switch movable into cooperative engagement with respective ones of said contact points; and wherein said one sidewall is provided with a slot and said one end portion is free of said contact points and extends through said slot to the interior of said container.

10. A container as defined in claim 3, said strip comprising a plurality of contact points spaced lengthwise of said strip and including an initial and a terminal one of said contact points with reference to said direction of movement, and a slide switch movable into cooperative engagement with respective ones of said contact points; and wherein said terminal contact point is provided on said one end portion at the trailing end of said strip.

11. A container as defined in claim 3, said aperture being elongated in direction lengthwise of said strip.

12. A container as defined in claim 3; further comprising a foil of synthetic plastic material freely overlying said aperture and connecting means at the inner side of said one sidewall and having peripheral edge portions secured to the latter spaced from said aperture and connecting means.

13. A container as defined in claim 3, said strip having a concealed surface facing toward and an exposed surface facing away from said one sidewall and being provided with a plurality of contact points spaced lengthwise of said strip, and a slide switch movable into cooperative engagement with respective ones of said contact points; said first portion being connected to said concealed surface and at least one of said contact points being located at said exposed surface directly over the juncture between said first portion and said concealed surface.

14. A container as defined in claim 3, said one sidewall having additional apertures provided one after the other in equal distances in lengthwise direction of the contact strip.

* * * * *